US012398018B2

(12) United States Patent
Helenius et al.

(10) Patent No.: US 12,398,018 B2
(45) Date of Patent: Aug. 26, 2025

(54) ROPE ANCHOR AND ELEVATOR ARRANGEMENT AND METHOD FOR CONSTRUCTING ELEVATOR

(71) Applicant: Kone Corporation, Helsinki (FI)

(72) Inventors: Juha Helenius, Helsinki (FI); Jorma Mustalahti, Helsinki (FI); Matti Rasanen, Helsinki (FI); Otto Lanz, Helsinki (FI); Janne Laine, Helsinki (FI); Anssi Venho, Helsinki (FI); Markku Haapaniemi, Helsinki (FI); Aki Haikonen, Helsinki (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 18/328,221

(22) Filed: Jun. 2, 2023

(65) Prior Publication Data

US 2023/0303362 A1 Sep. 28, 2023

Related U.S. Application Data

(63) Continuation of application No. PCT/EP2020/087464, filed on Dec. 21, 2020.

(51) Int. Cl.
*B66B 7/08* (2006.01)
*B66B 7/06* (2006.01)
(Continued)

(52) U.S. Cl.
CPC ................ *B66B 7/08* (2013.01); *B66B 7/068* (2013.01); *B66B 9/00* (2013.01); *B66B 19/00* (2013.01)

(58) Field of Classification Search
CPC .. B66B 7/08; B66B 7/068; B66B 7/10; B66B 19/02
See application file for complete search history.

(56) References Cited

U.S. PATENT DOCUMENTS

| | | | |
|---|---|---|---|
| 2007/0017749 A1 | 1/2007 | Dold et al. | |
| 2018/0084804 A1 | 3/2018 | Huang et al. | |

FOREIGN PATENT DOCUMENTS

| | | | |
|---|---|---|---|
| DE | 1068520 B | 11/1959 | |
| EP | 2371753 A1 | 10/2011 | |
| WO | WO-2016034757 A1 * | 3/2016 | ............. B66B 19/00 |

OTHER PUBLICATIONS

Machine Translation of EP 2371753.*

(Continued)

*Primary Examiner* — Diem M Tran

(74) *Attorney, Agent, or Firm* — Harness, Dickey & Pierce, P.L.C.

(57) ABSTRACT

The invention relates to a rope anchor for anchoring one or more ropes of an elevator, comprising at least a wedge housing comprising a tapering nest shaped to have a narrow end which is open towards a first direction, and a wide end which is open towards a second direction; and one or more wedge members mounted in the tapering nest for being wedged against a rope passing through the tapering nest; and one or more spring members for urging and/or arranged to urge the one or more wedge member towards the narrow end of the tapering nest; and a releasing mechanism actuatable to move the one or more wedge members (2,3) towards the wide end of the tapering nest. The invention also relates to an elevator arrangement comprising said anchor, as well as to a method implementing the arrangement.

14 Claims, 10 Drawing Sheets

(51) Int. Cl.
*B66B 9/00* (2006.01)
*B66B 19/00* (2006.01)

(56) References Cited

OTHER PUBLICATIONS

International Search Report and Written Opinion of the International Searching Authority for International Application No. PCT/EP2020/087464 dated Aug. 28, 2021.

* cited by examiner

ROPE ANCHOR AND ELEVATOR ARRANGEMENT AND METHOD FOR CONSTRUCTING ELEVATOR

CROSS-REFERENCE TO RELATED APPLICATION

This application is a continuation of PCT International Application No. PCT/EP2020/087464 which has an International filing date of Dec. 21, 2020, the entire contents of which are incorporated herein by reference.

FIELD OF THE INVENTION

The invention relates to a rope anchor for one or more ropes of an elevator, and to an elevator arrangement and a method for constructing an elevator. The elevator is preferably an elevator for transporting passengers and/or goods.

BACKGROUND OF THE INVENTION

In connection with so-called jump-lifts, the bottom part of an elevator hoistway is taken into use before the building has been completed. In this case the upper parts of the building as well as the top part of the elevator hoistway can be constructed at the same time as an elevator moving in the bottom part of the elevator hoistway already serves people on the lower floors of the building under construction. Typically in jump-lifts the elevator car moving in the lower parts of the elevator hoistway is supported and moved during construction-time use with a hoisting machine the mounting position of which can be changed to be higher during the method. The hoisting machine is typically mounted via a machine room which is vertically movable in the elevator hoistway or alternatively on some other movable structure or directly on a structure of the hoistway such as on a guide rail line or a bracket thereof.

The car is typically moved suspended by a roping during its use for transporting passengers and/or goods, wherein the roping passes around a drive wheel of the hoisting machine.

When the elevator hoistway under construction above the level of the hoisting machine has reached a sufficient stage of completion, the completed part of the elevator hoistway can be taken into use. At this stage a "jump" is performed, wherein the hoisting machine, e.g. together with the structures by which it is mounted in the hoistway, is hoisted higher in the elevator hoistway. Thereafter, the car can reach a higher position than before the jump and start to serve additional floors. During said hoisting additional portion of rope can be supplied from a rope supply storage through a releasable anchor by aid of pull caused by the hoisting. The anchor has been in the form of a clamp.

In prior art, a drawback has been that the clamp structure has been difficult to design reliable of its grip and easy to use in rope supply.

BRIEF DESCRIPTION OF THE INVENTION

The object of the invention is to introduce a rope anchor for one or more ropes of an elevator, and an elevator arrangement and a method for constructing an elevator, which are improved in terms of reliability of its grip and ease of use in rope supply.

An object is particularly to introduce a solution by which one or more of the above defined problems of prior art and/or drawbacks discussed or implied elsewhere in the description can be solved.

An object is particularly to provide a solution to facilitate that a top part of an elevator hoistway or components thereof can be constructed at the same time as an elevator car moving in the bottom part of the elevator hoistway already serves people on the lower floors of the building under construction.

An object is particularly to facilitate quick and easy operation of a rope anchor to enable running of the rope through the rope anchor.

It is brought forward a new rope anchor for anchoring one or more ropes of an elevator, comprising at least

- a wedge housing comprising a tapering nest shaped to have a narrow end which is open towards a first direction, and a wide end which is open towards a second (opposite) direction; and
- one or more wedge members mounted in the tapering nest for being wedged against a rope passing through the tapering nest; and
- one or more spring members for urging and/or arranged to urge the one or more wedge member towards the narrow end of the tapering nest; and
- a releasing mechanism actuatable to move the one or more wedge members towards the wide end of the tapering nest.

With this kind of solution one or more of the above mentioned objects can be achieved.

Preferable further details of the rope anchor are introduced in the following, which further details can be combined with rope anchor individually or in any combination.

In a preferred embodiment, the releasing mechanism comprises a turnable actuation member turnable to move the one or more wedge members towards the wide end of the tapering nest.

In a preferred embodiment, the rope is round in cross-section.

In a preferred embodiment, each said wedge member comprises a rope groove for receiving a rope. The rope groove preferably comprises two arc shaped side faces for supporting opposite arc shaped side faces of a rope, which rope is round in cross-section.

In a preferred embodiment, the rope groove is an undercut rope groove. The undercut rope groove is particularly such that it comprises a bottom recess for forming a space where the rope placed in the rope groove does not reach the bottom of the rope groove. The recess is empty or alternatively filled with elastic substance such as elastomer padding.

In a preferred embodiment, each of wedge members is movable along an inner side face of the tapering nest towards the narrow end, and back towards the wide end.

In a preferred embodiment, the rope anchor comprises two of said wedge members, and a compression gap passes between them through which gap a rope can be set to pass.

In a preferred embodiment, the rope anchor comprises a slide bearing disposed between the wall of the wedge housing and each said wedge member. The slide bearing facilitates ease of movement of the wedge members towards the narrow end for achieving wedging as well as towards the wide end for achieving releasing of the anchoring.

In a preferred embodiment, the slide bearing is made of different material than the wall of the wedge housing and each said wedge member. Preferably, the slide bearing comprises plastic, most preferably PTFE, but alternatively some other plastic could be used.

In a preferred embodiment, the slide bearing is a strip shaped member. Preferably, the strip member has thickness of less than 5 mm, length more than 5 cm and width more than 1 cm. Preferably, the contact length between the strip and the wedge housing and a said wedge member is likewise more than 5 cm.

In a preferred embodiment, the wedge housing and each said wedge member comprise metal. Preferably, then the rope anchor comprises a slide bearing disposed between the wall of the wedge housing and each said wedge member, which is non-metallic. This facilitates ease of movement of the wedge members even though the wedge housing and each said wedge member comprise metal.

In a preferred embodiment, the releasing mechanism comprises a push member movable to push one or more of the one or more wedge members mounted in the tapering nest towards the wide end;

a turnable actuation member connected in a force transmitting manner with the push member;

wherein the push member is movable by turning the actuation member (i.e. to push one or more of the one or more wedge members mounted in the tapering nest towards the wide end).

In a preferred embodiment, said turnable actuation member comprises a cam head turnable by actuation of the actuation member to force the push member to move to push said one or more of the one or more wedge members mounted in the tapering nest towards the wide end.

In a preferred embodiment, said cam head is turnable by actuation of the actuation member to press against a counterpart member for forcing the actuation member to move relative to the counterpart member.

In a preferred embodiment, movement of the actuation member relative to the counterpart member is arranged to cause the push member to move to push said one or more of the one or more wedge members mounted in the tapering nest towards the wide end.

In a preferred embodiment, the rope anchor comprises a frame and the counterpart member is immovable relative to the frame and the actuation member is turnable and movable in radial direction thereof relative to the frame.

In a preferred embodiment, the releasing mechanism comprises one or more transmission members between the rotatable actuating member and the push member for transmitting movement of the rotatable actuation member to the push member for moving it to push said one or more wedge members.

In a preferred embodiment, the actuating member and the push member are located on opposite sides of the wedge housing.

In a preferred embodiment, the actuation member is positioned on the side of the wedge housing towards which the wide end of the nest is open, and the push member is positioned on the side of the wedge housing towards which the narrow end of the nest is open.

In a preferred embodiment, the transmission members comprise a carrier member carrying the push member, and one or more elongated bars arranged to transmit movement of the actuating member to the carrier member. The one or more elongated bars extend from a first side of the wedge housing to a second side of the wedge housing.

In a preferred embodiment, the turnable actuation member comprises a hexagonal head. Thus, it is simply turnable by a bolt wrench or other corresponding tool, for example.

In a preferred embodiment, the rope anchor comprises one or more guide rollers for guiding the rope into the wide end of the tapering nest, in particular from the side of the housing towards which the wide end of the nest is open. In particular, said one or more guide rollers comprise a guide roller for acting on a portion of the rope, which portion extends into the nest from the side of the housing towards which the wide end of the nest is open.

In a preferred embodiment, said one or more guide rollers comprise a guide roller higher than the tapering nest when the rope anchor is disposed in such a position that the narrow end is below the wide end.

In a preferred embodiment, the rope anchor comprises a releasable rope locking means mounted on the frame (for locking one or more ropes immovable relative to the frame, including at least said rope, said locking means are arranged to act on a portion of the rope to be locked, which portion extends into the nest from the side of the housing towards which the wide end of the nest is open. This is advantageous, because said rope portion is not tensioned by a movable load of the elevator during transportation use of the elevator, wherein the movable load is an elevator or a counterweight. However, this rope portion may be tensioned by rope weight, which may pull the rope such that effect of wedging is harmfully counteracted and/or such that the rope balance and movement is difficult to control in some cases after releasing the wedging. Preferably, said rope locking means comprises two compression members on opposite sides of each rope to be locked, movable towards each other, preferably by screwable tightening means, such as screwable tightening means. The screwable tightening means comprise preferably at least one bolt and a nut, for example.

In a preferred embodiment, said rope locking means moreover comprises one or more springs between the two compression members elastically resisting movement of the two compression members towards each other.

In a preferred embodiment, the screwable tightening means comprise plurality of bolts extending through the two compression members, and nuts tightenable on the bolts. The screwable tightening means moreover preferably comprise disc springs stacked between each nut and a compression member to be elastically compressed when the screwable tightening means are tightened.

It is also brought forward a new elevator arrangement comprising an elevator car in a hoistway, and a roping comprising a rope connected to the elevator car, and a rope anchor anchoring the rope, which anchor is as described anywhere above or in any of the claims of this application.

With this kind of solution one or more of the above mentioned objects can be achieved.

Preferable further details of the elevator arrangement are introduced in the following, which further details can be combined with elevator arrangement individually or in any combination.

In a preferred embodiment, the elevator car is in use for transporting passengers and/or goods, in particular while the hoisting machine is in a first position I. Said use is preferably as defined referring to the first and/or second using in this application.

In a preferred embodiment, the elevator arrangement comprises a rope supply storage and the rope passes from the rope supply storage to the rope anchor, and therefrom to the elevator car.

In a preferred embodiment, the rope passes around a drive wheel of a hoisting machine movably mounted in a first position in the hoistway.

In a preferred embodiment, the elevator arrangement comprises a hoisting arrangement for hoisting the hoisting machine to a second position (II) in the hoistway, which is higher than said first position (I) and/or for hoisting the anchor higher in the hoistway.

In a preferred embodiment, the rope passes from the rope supply storage into the wide end of the tapering nest, through the tapering nest, and out from the narrow end of the tapering nest and to the elevator car.

In a preferred embodiment, each of the one or more wedge members is wedged against the rope passing through the tapering nest.

In a preferred embodiment, the rope anchor is disposed in such a position that the narrow end is below the wide end.

In a preferred embodiment, the rope supply storage is lower than the rope anchor, and the rope passes from the rope supply storage upwards, over a guide roller mounted higher than the tapering nest, and downwards to the rope anchor.

In a preferred embodiment, the rope supply storage is more than 10 meters lower than the rope anchor. The rope supply storage preferably comprises one or more rope reels.

In a preferred embodiment, the elevator arrangement comprises a releasable rope locking means mounted on the frame arranged to lock one or more ropes immovable relative to the frame, including at least said rope, said locking means particularly being arranged to act on a portion of the rope to be locked, which portion extends into the nest from the side of the housing towards which the wide end of the nest is open.

It is also brought forward a new method for constructing an elevator comprising providing an elevator arrangement as defined anywhere above or in any of the claims of this application, and

- using (first using) the elevator car for transporting passengers and/or goods while the hoisting machine is in said first position (I); and
- performing construction work while the hoisting machine is in said first position (I); and thereafter
- releasing the anchor comprising actuating the releasing mechanism to move the one or more wedge members towards the wide end of the tapering nest; and thereafter
- hoisting the hoisting machine and mounting it to a second position (II) which is higher than the first position (I), the method comprising during said hoisting supplying additional portion of rope from the rope supply storage through the released anchor, e.g. by aid of pull caused by the hoisting and thereafter
- reanchoring the rope with the anchor, the reanchoring comprising actuating the releasing mechanism in reverse manner for allowing the one or more springs to the move the one or more wedge member towards the narrow end of the tapering nest; and thereafter
- using (second using) the elevator car for transporting passengers and/or goods while the hoisting machine is in said second position (II).

With this kind of solution one or more of the above mentioned objects can be achieved.

Preferable further details of the method are introduced in the following, which further details can be combined with method individually or in any combination.

In a preferred embodiment, the hoisting also comprises hoisting the anchor and mounting it to a position higher than before and/or hoisting a rope fixing of the rope and mounting it to a position higher than before.

In a preferred embodiment, said first and/or second using comprises receiving by an elevator control system call signals from one or more user interfaces, such as one or more user interfaces located at floors and/or in the elevator car and/or mobile user interfaces, which elevator control system is connected to the hoisting machine, and automatically controlling in response to said call signals, by the elevator control system, the hoisting machine (in particular rotation of a motor of the hoisting machine), and thereby movement of the elevator car.

In a preferred embodiment, the releasing the anchor also comprises releasing the releasable rope locking means, i.e. when the arrangement/the rope anchor comprises a releasable rope locking means.

In a preferred embodiment, the elevator arrangement comprises an elevator car and a counterweight; and the rope interconnects the elevator car and the counterweight.

In a preferred embodiment, the car has an interior space suitable for receiving a passenger or passengers, and a door movable between open and closed state for opening and closing the interior space.

BRIEF DESCRIPTION OF THE DRAWINGS

In the following, the present invention will be described in more detail by way of example and with reference to the attached drawings, in which.

The foregoing aspects, features and advantages of the invention will be apparent from the drawings and the detailed description related thereto.

DETAILED DESCRIPTION

Figure 1:
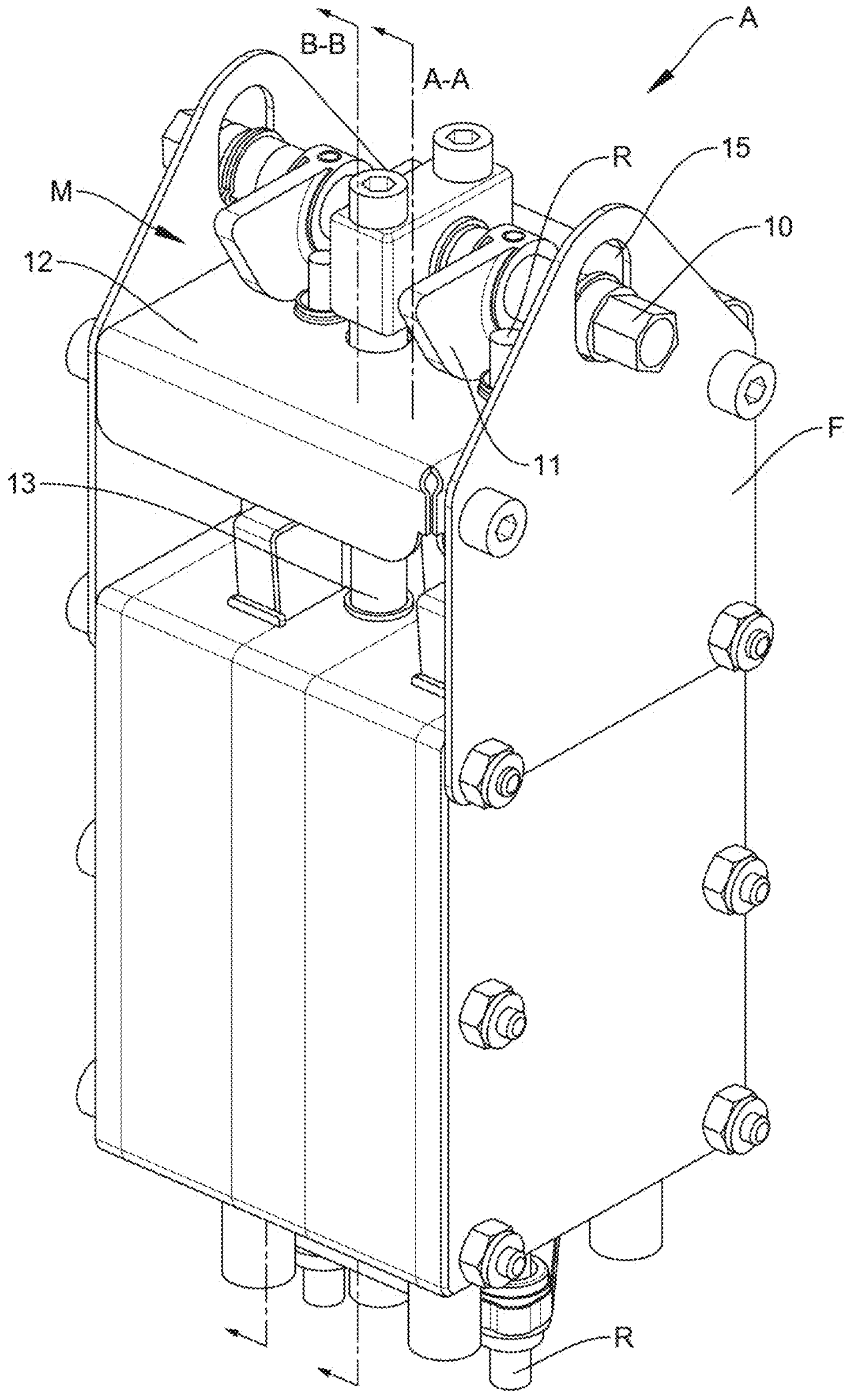
FIG. 1 illustrates a perspective view of a rope anchor according to a first embodiment.
Figure 2:
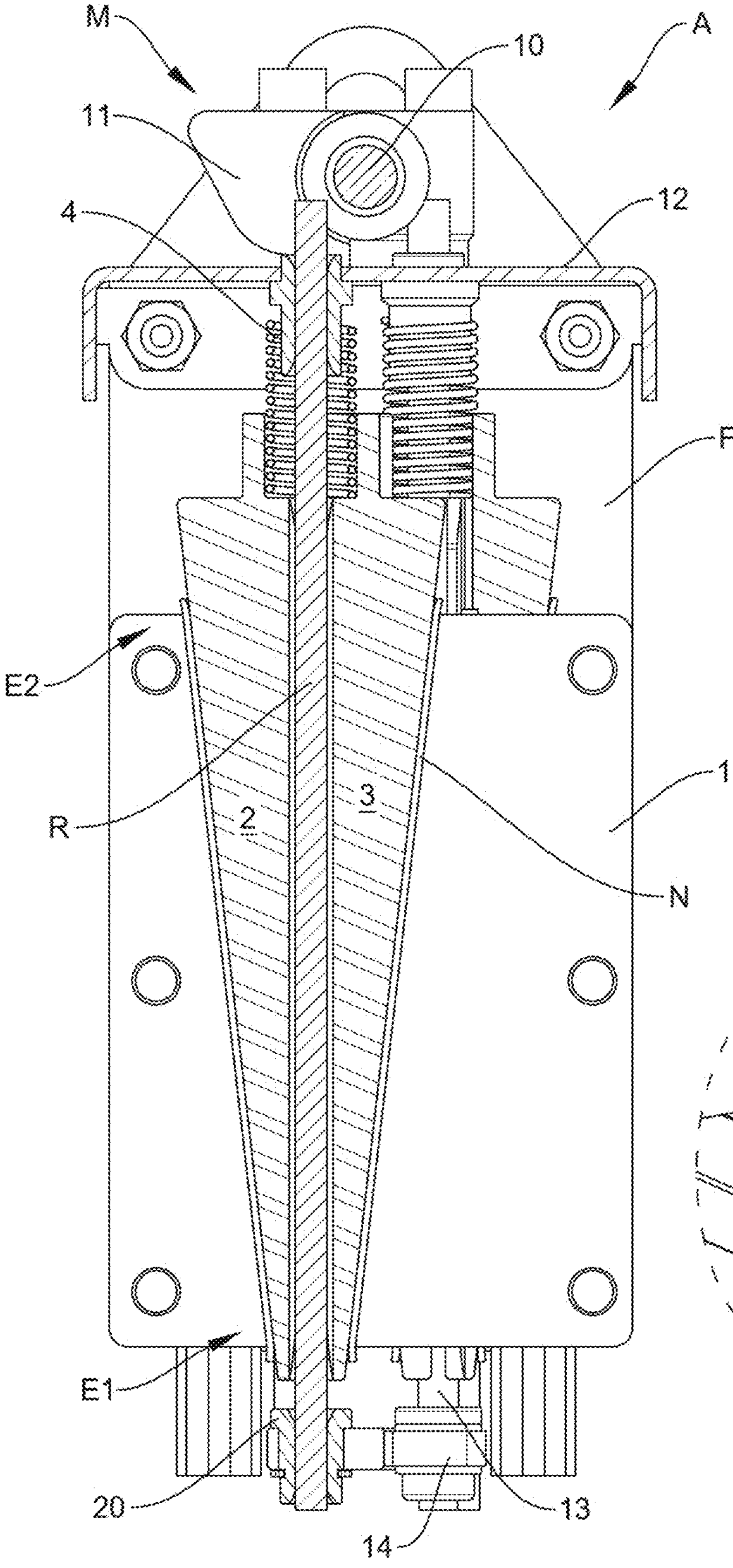
FIG. 2 illustrates a cross section A-A of the rope anchor of FIG. 1 in anchoring state as well as a rope (illustrated partially) anchored with the rope anchor.

FIG. 1 illustrates a first embodiment of a rope anchor A for anchoring one or more ropes R of an elevator. FIG. 2 illustrates the rope anchor A and a rope R anchored by it. The rope R has been illustrated partially.

The rope anchor A comprises a wedge housing 1 comprising a tapering nest N shaped to have a narrow end E1 which is open towards a first direction (downwards in FIG. 2), and a wide end E2 which is open towards a second direction (upwards in FIG. 2; and one or more wedge members 2,3 mounted in the tapering nest N for being wedged against a rope R passing through the tapering nest N.

Each said wedge member 2,3 is movable along an inner side face of the tapering nest N towards the narrow end E1, and back towards the wide end E2.

The rope anchor A moreover comprises one or more spring members 4 for urging and/or arranged to urge the one or more wedge member 2,3 towards the narrow end E1 of the tapering nest N. Thus, the rope anchor A can itself facilitate wedging and resist releasing of the wedging, which, inter alia, facilitates firmness and reliability of the anchoring and thereby also safety.

The rope anchor A moreover comprises a releasing mechanism M actuatable to move the one or more wedge members 2,3 towards the wide end E2 of the tapering nest N. This is particularly advantageous since it enables quick and easy operation of the rope anchor A to enable running of the rope R through the rope anchor A. This is advantageous when the elevator is a construction time elevator, such as in particular a so-called jump-elevator, where additional portion of the rope R is needed to be fed into the elevator roping system. A feasible wedging type of rope anchor A is thereby provided for this kind of elevator.

In the preferred embodiment of FIGS. 1-8, each said R is round in cross-section. Accordingly, in the preferred embodiment illustrated rope anchor A is suitable for anchoring one or more ropes R is round in cross-section. This facilitates that wedging type of rope anchor A is thereby provided for a construction time elevator where the rope(s) R to be anchored are round in cross-section. Thus, cheap and durable conventional type of ropes can be simply used in a construction time environment, where these properties are valuable for the sake of safety.

In the preferred embodiment of FIGS. 1-8, the releasing mechanism M comprises a turnable actuation member 10 turnable to move the one or more wedge members 2,3 towards the wide end E2 of the tapering nest N. The turnable actuation member 10 preferably comprises a hexagonal head, as illustrated in FIG. 1. Thus, it is simply turnable by a bolt wrench, for example.

Figure 3:
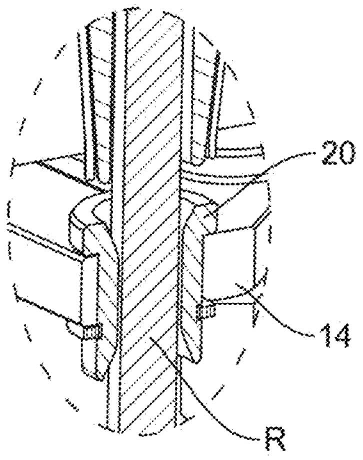
FIG. 3 illustrates a perspective view of a detail of the rope anchor of FIG. 1 in an anchoring state.
Figure 4:
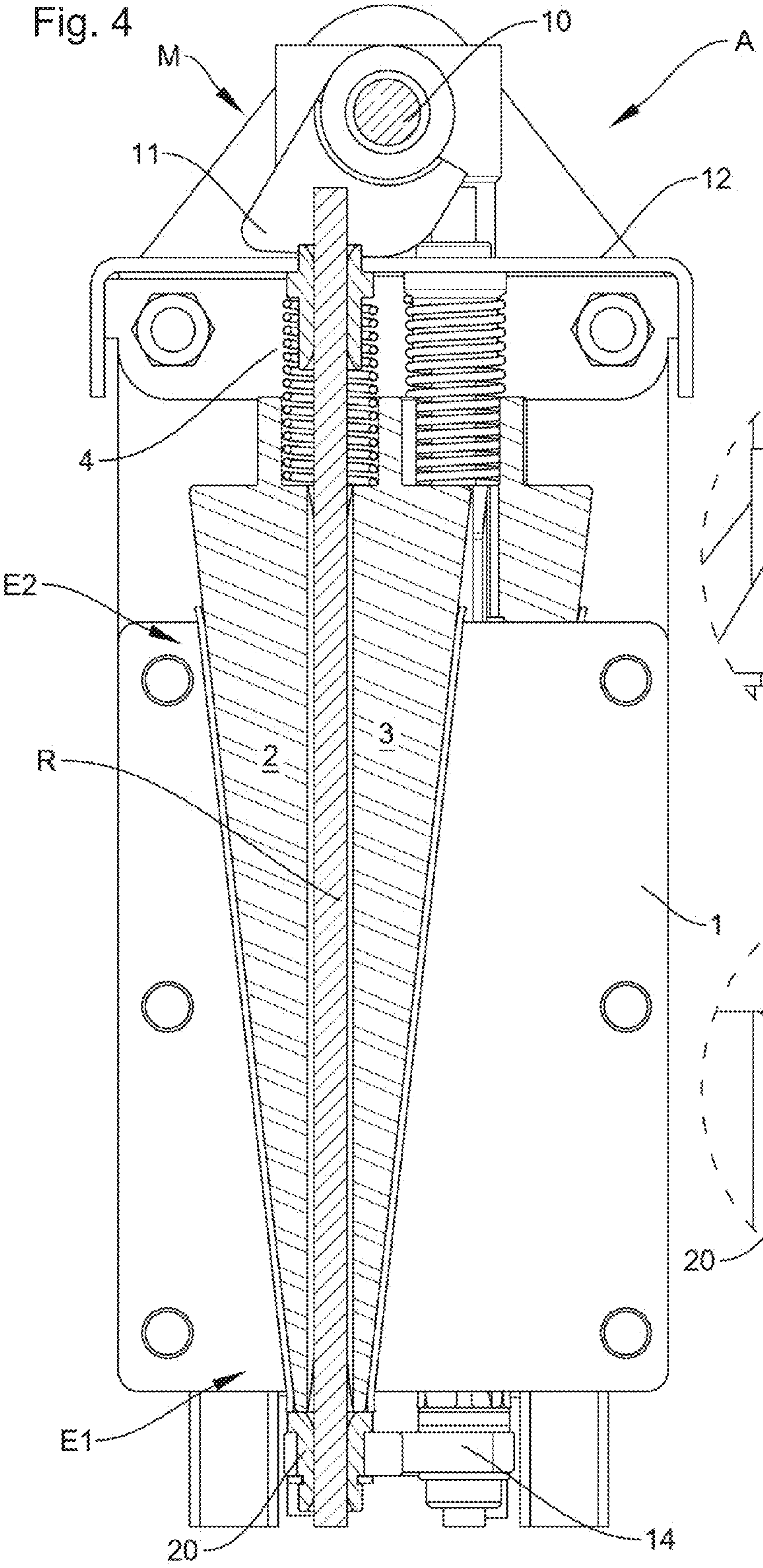
FIG. 4 illustrates a cross section of the rope anchor of FIG. 1 in a released state as well as a rope (illustrated partially).
Figure 5:
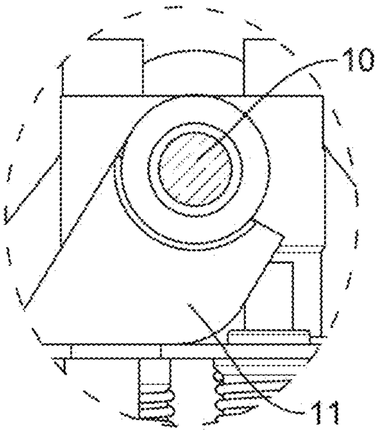
FIG. 5 illustrates a detail of the rope anchor of FIG. 4.
Figure 6:
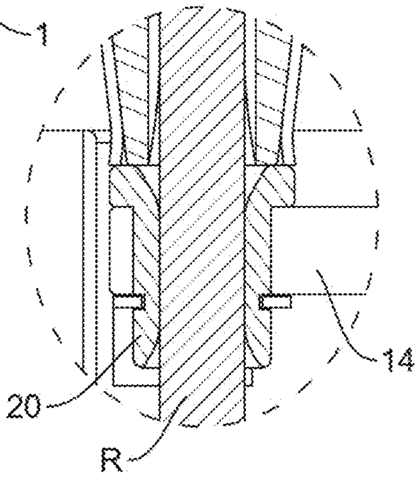
FIG. 6 illustrates an enlargement view of a detail of FIG. 4.
Figure 7:
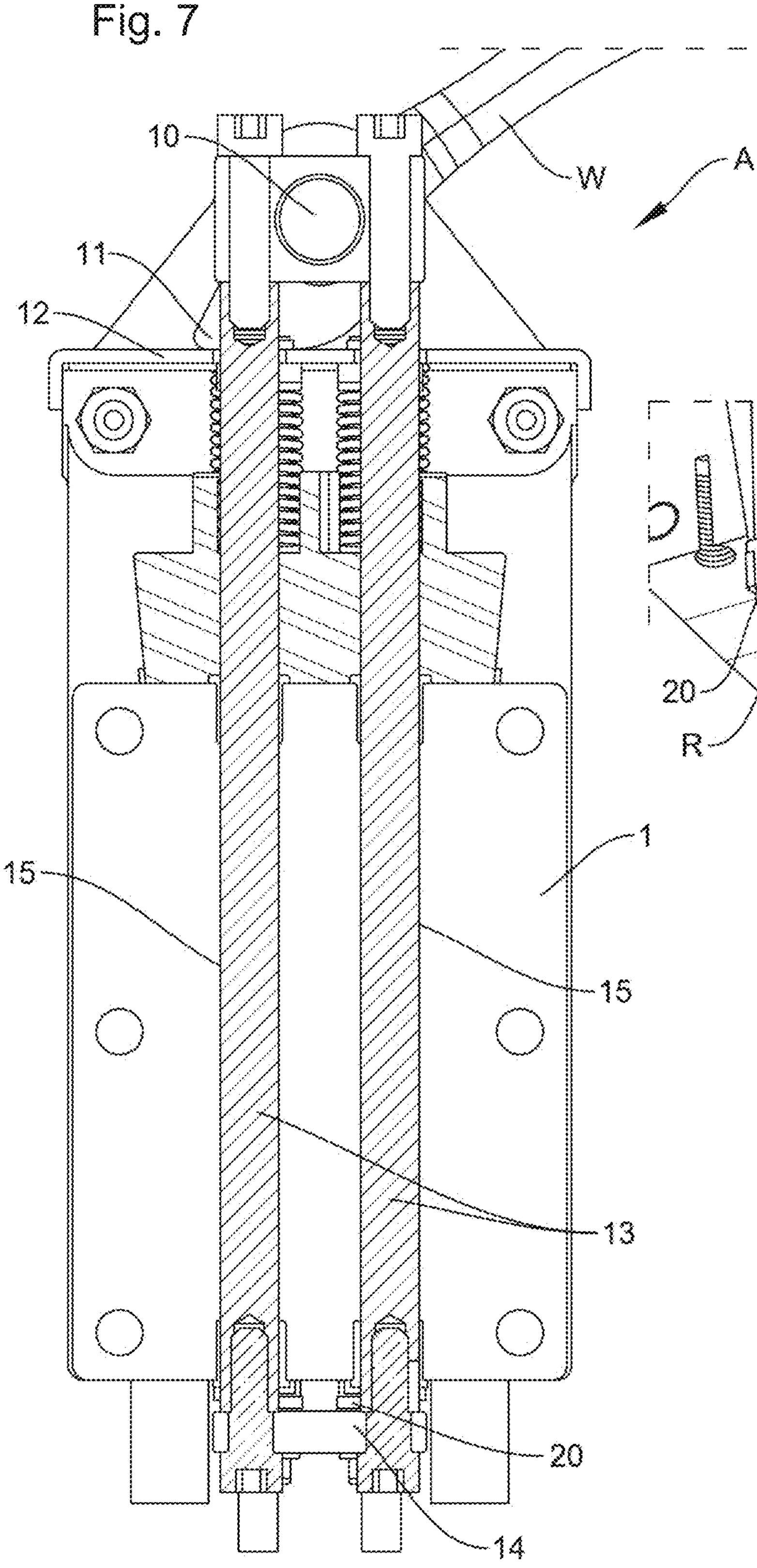
FIG. 7 illustrates a cross section B-B of the rope anchor of FIG. 1 in a released state.
Figure 8:
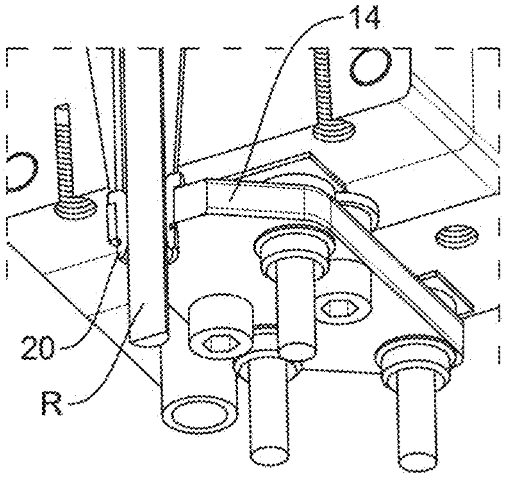
FIG. 8 illustrates a perspective view of a detail of the rope anchor of FIG. 1 in a released state.

Preferred details of the releasing mechanism M are visible in FIGS. 2 and 3. FIG. 2 illustrates the rope anchor A and a rope R, when the rope anchor A is in anchoring state, and FIG. 2 when rope anchor A is in released state where the releasing mechanism M has been actuated.

The releasing mechanism M comprises a push member 20 movable to push the wedge members 2,3 mounted in the tapering nest N towards the wide end E2, and a turnable actuation member 10 connected in a force transmitting manner with the push member 20; wherein the push member 20 is movable (to push the wedge members 2,3 mounted in the tapering nest N towards the wide end E2), by turning the turnable actuation member 10.

The rope anchor A, preferably in particular said turnable actuation member 10, comprises a cam head 11 turnable by actuation of the actuation member 10 to force the push member 20 to move to push the wedge members 2,3 mounted in the tapering nest N towards the wide end E2.

Said cam head 11 is turnable by actuation of the actuation member 10 to press against a counterpart member 12 for forcing the actuation member 10 to move relative to the counterpart member 12. Movement of the actuation member 10 relative to the counterpart member 12 is arranged to cause the push member 20 to move to push said wedge members 2,3 mounted in the tapering nest N towards the wide end E2.

In the preferred embodiment of FIGS. 1-8, the rope anchor A comprises a frame F and the counterpart member 12 is immovable relative to the frame F and the actuation member 10 is turnable and movable in radial direction thereof relative to the frame F. The releasing mechanism M comprises transmission members 13,14 between the movable actuating member 10 and the push member 20 for transmitting said radial movement of the movable actuation member 10 to the push member 20 for moving it to push said wedge members 2,3. The transmission members 13,14 are visible e.g. in FIG. 7. In this case, the transmission members 13,14 comprise a carrier plate 14 carrying the push member 20, and elongated bars 13 arranged to transmit radial movement of the actuating member 10 to the carrier plate 14. The elongated bars 13 extend from a first side of the wedge housing 1 to a second side of the wedge housing 1, in particular through it. Hereby, the actuating member 10 and the push member 20 can be located on opposite sides of the wedge housing 1 as illustrated. This provides that the actuation member 10 can be simply positioned on the side (upper side in the Figures) of the housing 1 towards which the wide end E2 of the nest N is open, yet the push member is positioned on the side (lower side in the Figures) of the housing 1 towards which the narrow end E1 of the nest N is open. Thus, a push can be achieved from the side (lower side in the Figures) of the housing 1 towards which the narrow end E1 of the nest N is open even though the actuation member 10 is elsewhere. This facilitates that the actuation member 10 is easy to access and position relative to the rope(s) R.

For enabling radial movement of the movable actuation member 10, the movement thereof is preferably guided by guide means, which comprise preferably said elongated bars 13 and guide holes 15 formed in the wedge housing 1, and through which guide holes 15 said elongated bars 13 extend and which guide holes 15 are arranged to guide said elongated bars 13 to move of the elongated bars 13 only in radial direction of the actuation member 10.

The push member 20 is preferably a ring surrounding the rope R, which ring is movable around the rope R to press against the wedge members 2,3.

The operation of the releasing mechanism M becomes apparent based on FIGS. 1-8. That is, when actuated by turning, e.g. using a wrench W, the actuation member 10 turns such that the cam head 11 turns to press against a counterpart member 12. This pressing forces the actuation member 10 to move relative to the counterpart member 12 in its radial direction (upwards in FIGS. 2 and 3). This radial movement is transmitted by transmission members 13,14 provided between the movable actuating member 10 and the push member 20 to the push member 20 such that it is moved (upwards in FIGS. 2 and 3) to push said wedge members 2,3.

Figure 9:
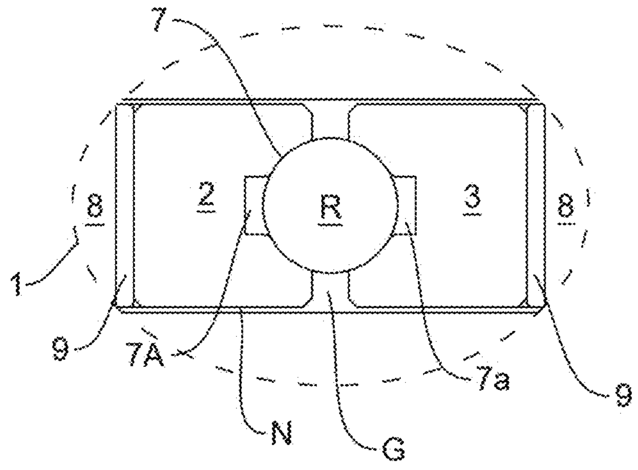
FIGS. 9 and 10 illustrates preferred details of the rope anchor of FIG. 1.

FIG. 9 illustrates preferred further details of the wedge members 2,3 and the surrounding structures thereof. As illustrated in FIG. 9, it is preferred that each said wedge member 2,3 comprises a rope groove 7 for receiving a rope R. The rope groove 7 preferably comprises a comprises two arc shaped side faces for supporting opposite arc shaped side faces of the rope R, which is round in cross-section. The rope groove 7 is preferably an undercut rope groove. Thus, the rope groove comprises a bottom recess 7*a*. The recess forms a space where the rope R placed in the rope groove 7 not reach the bottom of the rope groove 7.

Figure 10:
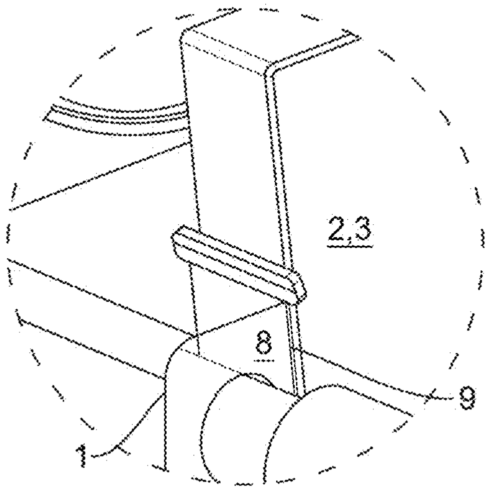

The rope anchor A preferably comprises a slide bearing 9 disposed between the wall of the wedge housing 1 and each said wedge member 2,3, as illustrated in FIGS. 9 and 10. Preferably, the slide bearing 9 is made of different material than the wall 8 of the wedge housing 1 and each said wedge member 2,3. Preferably, the slide bearing 9 comprises plastic, such as PTFE. Preferably, the wedge housing 1 and each said wedge member 2,3 comprise metal. Preferably, the slide bearing 9 is non-metallic. Preferably, slide bearing 9 is a strip shaped member. Preferably, the strip shaped member 9 has thickness of less than 5 mm, length more than 5 cm and width more than 1 cm.

Figure 11:
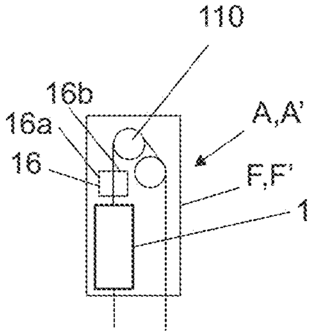
FIG. 11 illustrates preferred details of the rope anchor of FIG. 1.

As schematically illustrated in FIG. 11, the rope anchor A preferably, although not necessarily, comprises a releasable rope locking means 16 mounted on the frame F for locking one or more ropes R immovable relative to the frame F, the ropes to be locked including at least said rope R. The locking means 16 are arranged to act on a portion of the rope R to be locked, which portion extends into the nest N from the side (upper side in the Figures) of the housing 1 towards which the wide end E2 of the nest N is open. This rope portion is not tensioned by a movable load of the elevator, wherein the load is an elevator or a counterweight. However this rope portion may be tensioned by rope weight, which may pull the rope such that effect of wedging is harmfully counteracted and/or such that the rope balance and movement is difficult to control in some cases after releasing the wedging. The releasable rope locking means 16 facilitates controlling rope tensions during releasing of the releasing mechanism M. For example rope tension can be hereby at least partially shifted from being carried by the wedges 2,3 and the nest N, to be carried by the locking means 16. After the releasing, releasing of the locking means 16 can be performed. Thereby the wedges 2,3 and the nest N can serve as the main means for anchoring the rope(s) R, and the locking means 16 as an auxiliary means for aiding the releasing phase and/or for eliminating undesired tension of the rope portions tensioned the weight of the ropes. Said rope locking means 16 preferably comprises two compression members 16*a*, 16*b* on opposite sides of each rope R to be locked, movable towards each other, preferably by screwable tightening means 17, such as screwable tightening means comprising a bolt and nut. Preferred details of the tightening means 17 have been illustrated in FIGS. 12, 16-18.

As schematically illustrated in FIG. 11, the rope anchor A preferably, although not necessarily, comprises one or more guide rollers for guiding the rope R into the wide end E2 of the tapering nest N in particular from the side (upper side in the Figures) of the housing 1 towards which the wide end E2 of the nest N is open. Said one or more guide rollers comprise a guide roller 110 for acting on a portion of the rope R, which portion extends into the nest N from the side (upper side in the Figures) of the housing 1 towards which the wide end E2 of the nest N is open. The guide roller 110 higher than the tapering nest N when the rope anchor A is disposed in such a position that the narrow end E2 is below the wide end E1. Guidance of the rope R into the wide end E2 of the tapering nest N facilitates that movement and path of rope R can be controlled when the rope R is made to run through the nest N, in particular when additional portion of rope R is supplied from a rope supply storage through the released anchor A,A'. Hereby, the rope R can move smoothly and it does not chafe against parts of the anchor A,A' during said supplying. The guide roller 110 is preferably freely rotatable.

Figure 12:
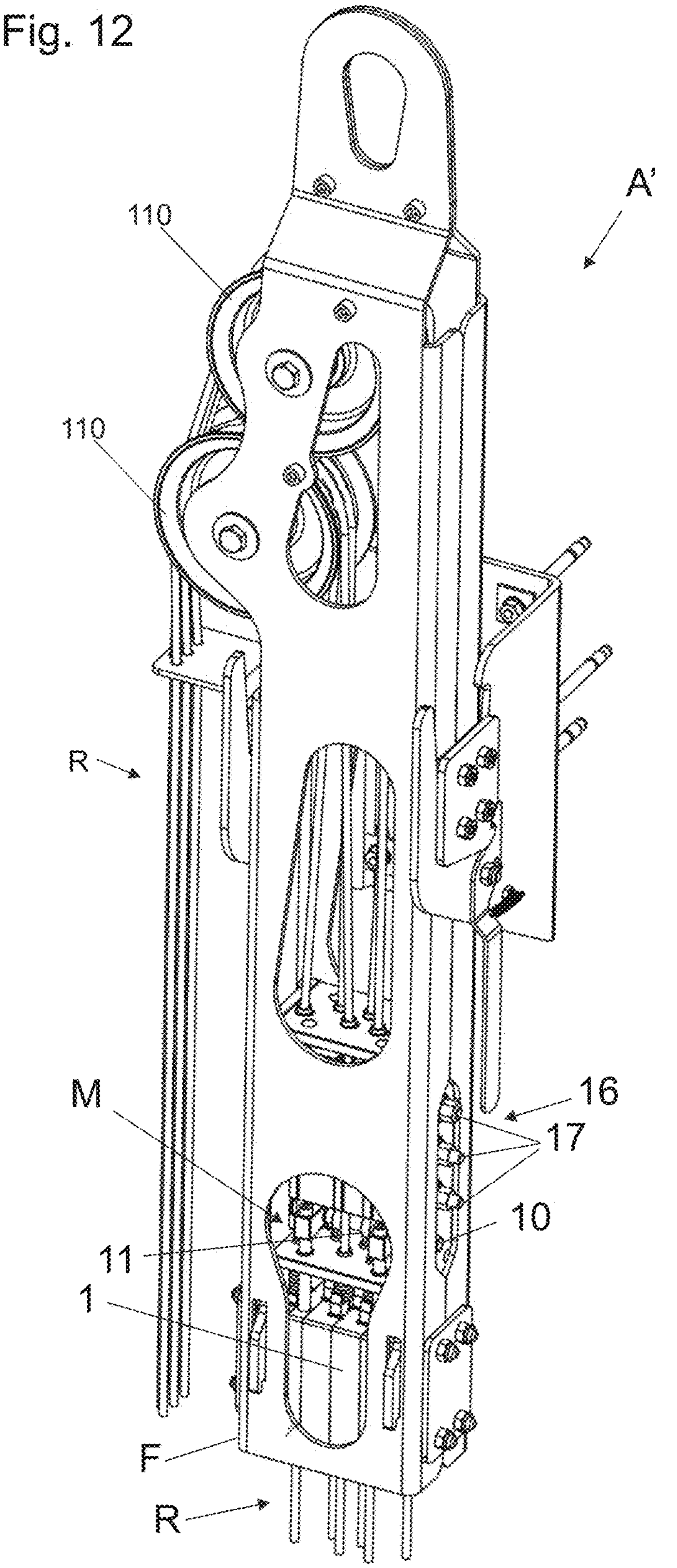
FIG. 12 illustrates a perspective view of a rope anchor according to a second embodiment.
Figure 16:
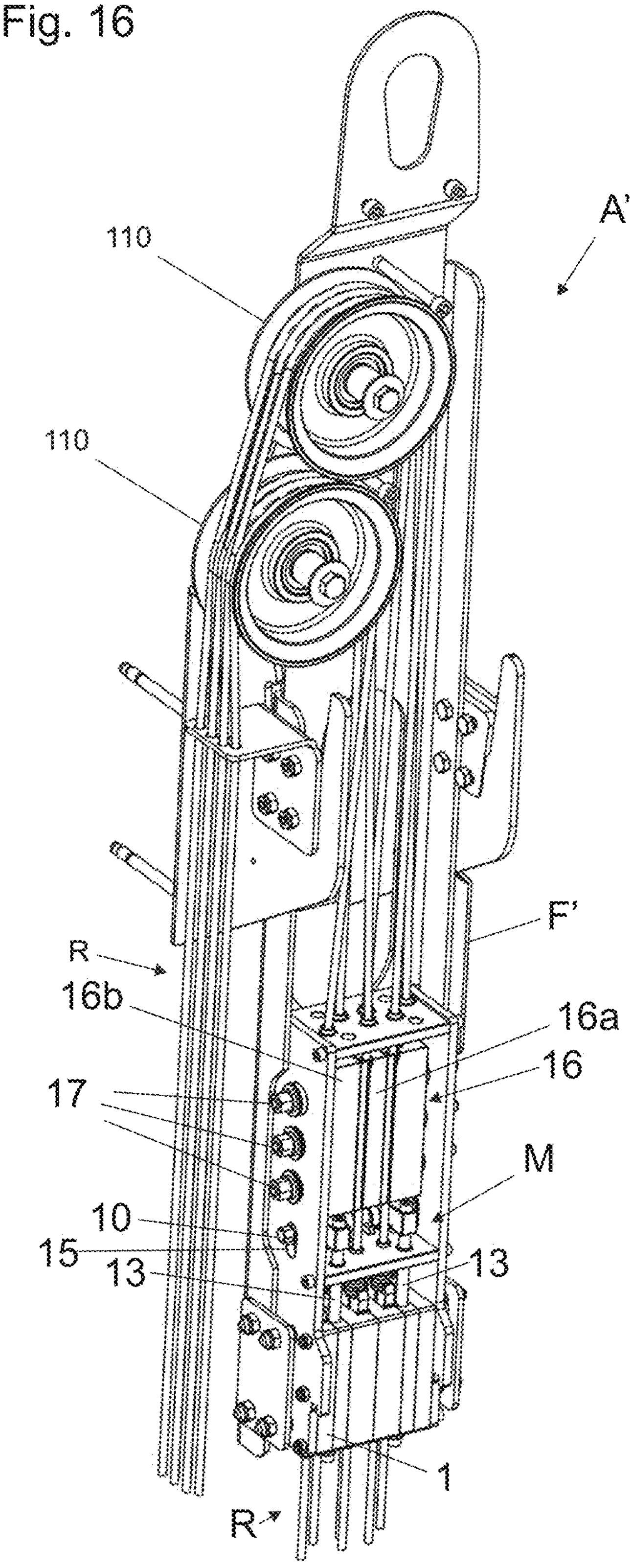
FIGS. 16-18 illustrate partial views showing preferred details of the rope anchor of FIG. 12.
Figure 17:
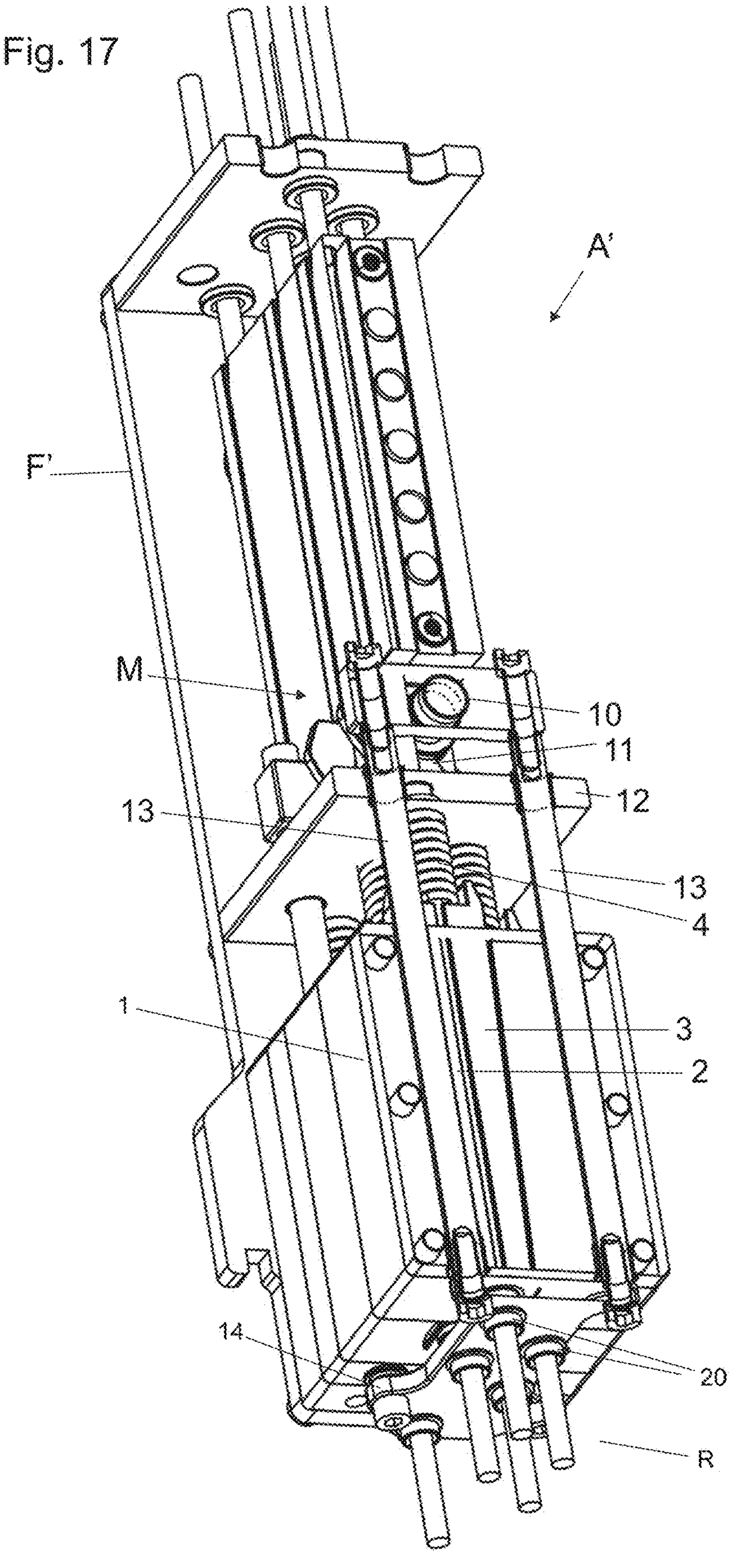

FIGS. 12, 16 and 17 illustrate a second embodiment of a rope anchor, which rope anchor A' in accordance to the anchor A' schematically shown in FIG. 11, i.e. when the anchor comprises said a locking means 16 and a guide roller 110. In FIGS. 12, 16 and 17 the anchor has been referred to as A' and the frame as F'. The frame is in the anchor A' of FIGS. 12, 16 and 17 particular shaped as illustrated by reference numeral F' so that it can carry the locking means 16 and a guide roller 110. Other parts of the anchor A' are as described and illustrated in FIGS. 1-11. The number of the ropes however is different than in the first embodiment.

Figure 13:
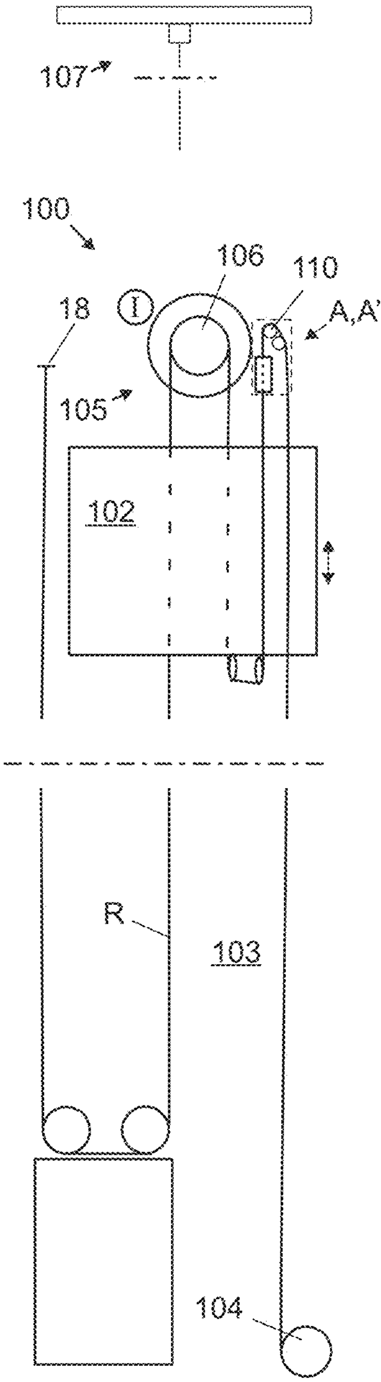
FIGS. 13-15 illustrate an elevator arrangement according to an embodiment in different phases of a method according to an embodiment.
Figure 14:
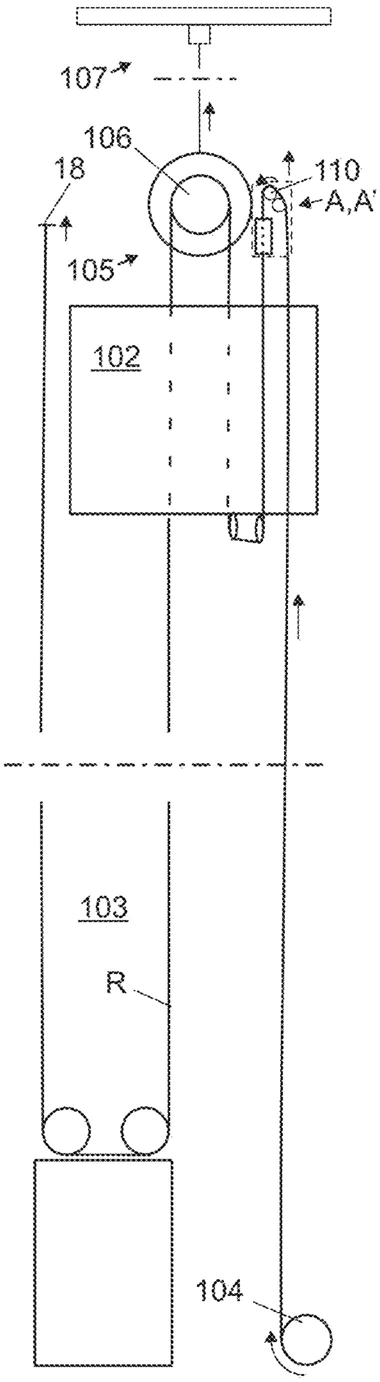
Figure 15:
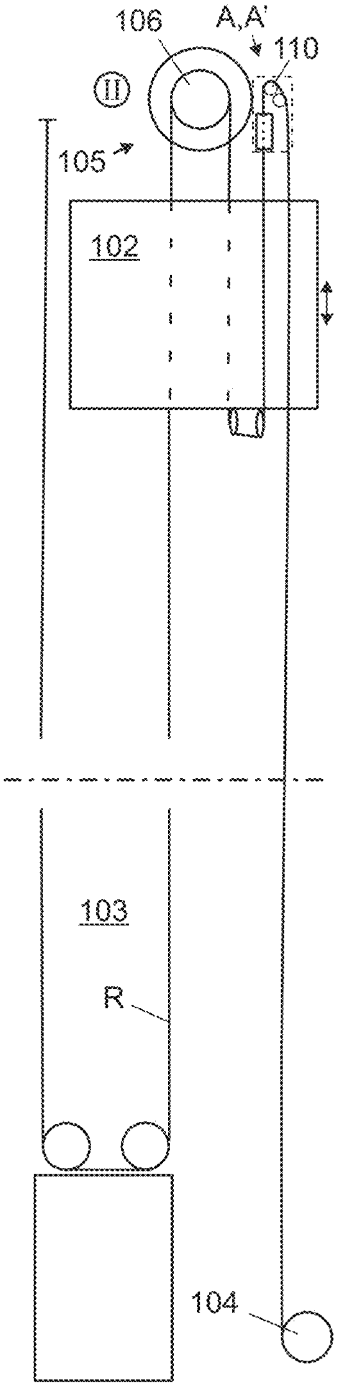

FIGS. 13-15 an elevator arrangement 100 in different phases of a method according to an embodiment.

In the elevator arrangement 100 of FIG. 13, the arrangement 100 comprises an elevator car 102 in a hoistway 103, and a roping 101 comprising a rope R connected to the elevator car 102, and a rope anchor A;A' as described referring to any of the FIGS. 1-12,16-18 anchoring the rope R. The rope anchor A;A' has been illustrated schematically in FIGS. 13-15. The elevator arrangement 100 comprises a rope supply storage 104 and the rope R passes from the rope supply storage 104 to the rope anchor A,A', and therefrom to the elevator car 102. The rope R passes around a drive wheel 106 of a hoisting machine 105 movably mounted in a first position I in the hoistway. The rope R passes from the rope supply storage 104 into the wide end E2 of the tapering nest N, through the tapering nest N, and out from the narrow end E1 of the tapering nest N and to the elevator car 102.

In the elevator arrangement 100 of FIG. 13, the rope anchor A,A' is in anchoring state (i.e. non-released state) as illustrated for example in FIGS. 2 and 12, for example. The elevator car is in use for transporting passengers and/or goods while the hoisting machine 105 is in a first position I. The elevator arrangement 100 comprises a hoisting arrangement 107 for hoisting the hoisting machine 105 to a second position II in the hoistway which is higher than said first position I and/or the anchor A,A' higher in the hoistway 103. When the rope anchor A,A' is in anchoring state, each of the one or more wedge members 2,3 is wedged against the rope R passing through the tapering nest N, as illustrated in FIG. 2 for example.

In the arrangement 100 of FIG. 13, the rope anchor A,A' is disposed in such a position that the narrow end E2 is below the wide end E1. The rope supply storage 104 is lower than the rope anchor A;A', and the rope R passes from the rope supply storage 104 upwards, over a guide roller 110 mounted higher than the tapering nest N, and downwards to the rope anchor A;A'. The preferred features and advantages of the guide roller 110 have been described earlier above. Preferably, the rope supply storage 104 is more than 10 meters lower than the rope anchor A;A', whereby the advantages of the guide roller 110 are most considerable. The rope R preferably passes via said releasable rope locking means 16, which may be in a locking state or not. The rope supply storage 104 preferably comprises one or more rope reels. Said one or more rope reels can be mounted on a landing or in the pit of the hoistway, for example.

In the method for constructing an elevator according to an embodiment, the method comprises providing an elevator arrangement 100 illustrated and described referring to FIG. 13.

The method comprises using (first using) the elevator car 102 for transporting passengers and/or goods while the hoisting machine 105 is in said first position I; and performing construction work while the hoisting machine 105 is in a first position I; and thereafter releasing the anchor A;A' the releasing comprising actuating the releasing mechanism M to move the one or more wedge members 2,3 towards the wide end E2 of the tapering nest N; and thereafter hoisting the hoisting machine 105 and mounting it to a second position II which is higher than the first position I, the method comprising during said hoisting supplying additional portion of rope R from the rope supply storage 104 through the released anchor A;A', preferably by aid of pull caused by the hoisting; and thereafter (i.e. after said hoisting) reanchoring the rope R with the anchor A;A'. The reanchoring preferably comprises actuating the releasing mechanism M, in particular in a reverse manner, for allowing the one or more springs to the move the one or more wedge member 2,3 towards the narrow end E1 of the tapering nest N. After said reanchoring the method comprises using (second using) the elevator car 102 for transporting passengers and/or goods while the hoisting machine 105 is in said second position II.

The hoisting preferably also comprises hoisting the anchor A;A' and mounting it to a position higher than before and/or hoisting a rope fixing 18 of the rope R and mounting it to a position higher than before.

For facilitating the hoisting step of the method, the method preferably comprises suspending the hoisting machine 105, the rope anchor A,A', rope fixing 18 on the hoisting arrangement 107. These can be hoisted separately or simultaneously e.g. by a support structure (not showed) hanging from the hoisting arrangement 107. In the latter case, the support structure can be a hoisting platform vertically movable in the hoistway, such as a vertically movable working platform, for instance.

The releasing the anchor A;A' also comprises releasing the releasable rope locking means 16, when the arrangement/the rope anchor A' comprises a releasable rope locking means 16.

Figure 18:
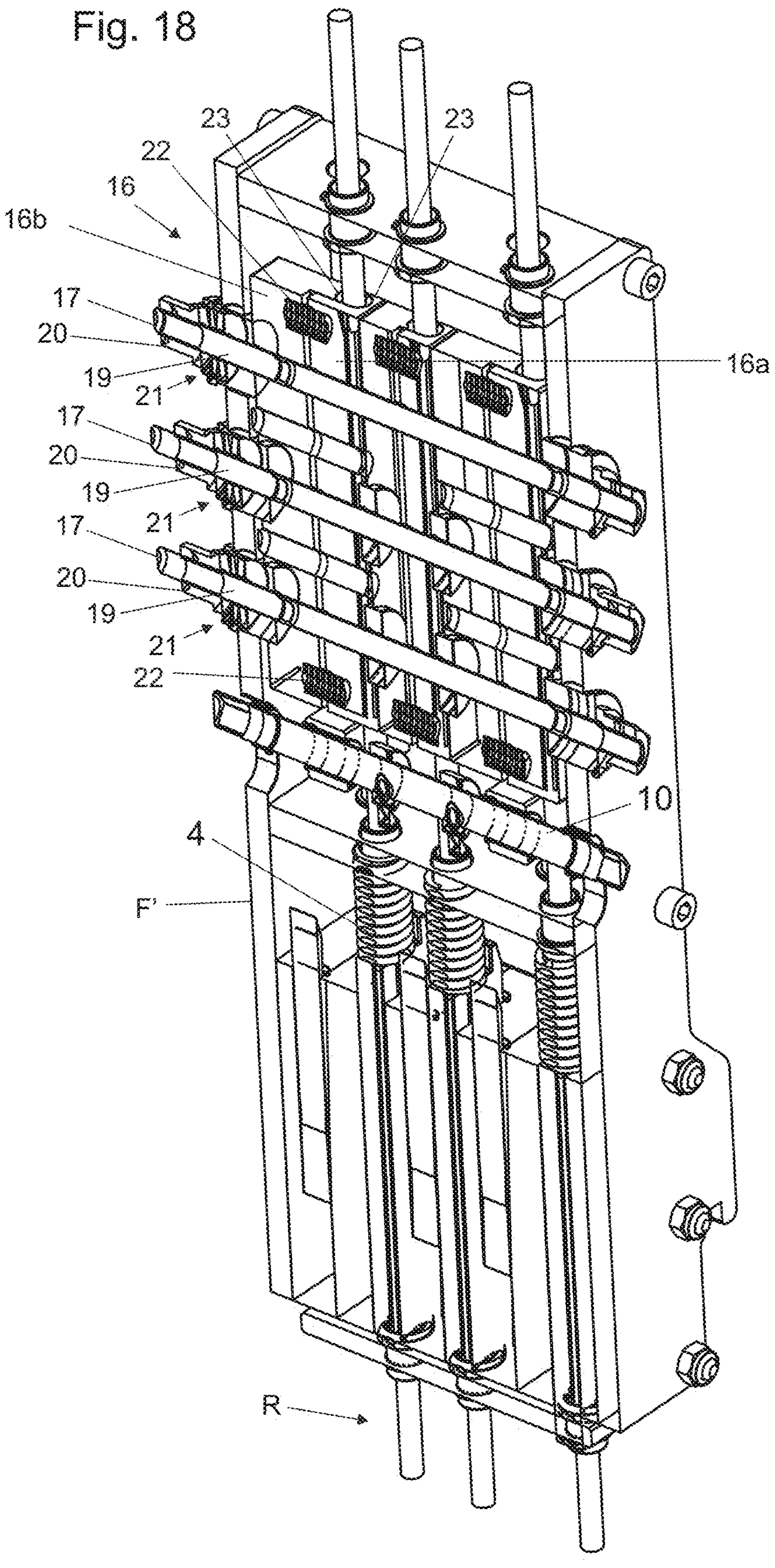

FIG. 18 illustrates a cross section of the rope anchor A' of FIG. 12 showing preferred further details of the releasable rope locking means 16. In FIG. 18, said rope locking means 16 comprises two compression members **16*a*,16*b* on opposite sides of each rope R to be locked, movable towards each other, preferably by screwable tightening means 17, which are in the embodiment of FIG. 18 screwable tightening means 17 comprising plurality of bolts 19 extending through the two compression members 16*a*,16*b*, and nuts 20 tightenable on the bolts 19. The screwable tightening means 17 moreover comprise disc springs 21 stacked between each nut 20 and a compression member 16*b* to be elastically compressed when the screwable tightening means 17 are tightened. This facilitates that a tightening force is achieved and maintained relatively constant. Said rope locking means 16 moreover comprises springs 22 between the two compression members 16*a*,16*b* elastically resisting movement of the two compression members 16*a*,16*b* towards each other. This provides that when the locking is released by releasing the screwable tightening means 17, the spring force urges the two compression members 16*a*, 16*b* on opposite sides of each rope R away from each other. The springs 22 ensure that when locking means are released, a clearance is formed between the rope R and the two compression members 16*a*, 16*b*, and rope R can be guided to pass freely via the locking means 16** unharmed by friction.

In FIG. 18, each of the two compression members **16*a*, 16*b* on opposite sides of each rope R to be locked comprises a rope groove 23 for receiving a rope R, the rope R being compressed in the groove 23 when the releasable rope locking means 16**.

Generally preferably, the rope anchor A comprise two of said wedge members 2,3, and a compression gap G passes between them through which gap G a rope R can be set to pass. However, it is also possible to implement the solution with only one wedging member in the nest. In this case, the compression gap would be formed between the sole wedging member and an inner side face of the tapering nest.

In general, preferably the rope R is a hoisting rope. In general, the hoisting machine 105, preferably comprises a drive wheel 106 for driving the hoisting rope, as well as a motor for rotating the drive wheel 106.

In general, in addition to or as an alternative to said locking means 16, the guide roller 110 can be lockable to be unrotatable relative to a frame F,F', whereby transmission of tension to the wedges can be at least partially eliminated. This is however not necessary.

In general, in Figures multiple ropes R have been showed, since an elevator roping typically comprises more than one ropes. In Figures, each rope R has been anchored as described.

It is to be understood that the above description and the accompanying Figures are only intended to teach the best way known to the inventors to make and use the invention. It will be apparent to a person skilled in the art that the inventive concept can be implemented in various ways. The above-described embodiments of the invention may thus be modified or varied, without departing from the invention, as appreciated by those skilled in the art in light of the above teachings. Itis therefore to be understood that the invention and its embodiments are not limited to the examples described above but may vary within the scope of the claims.

The invention claimed is:

1. A rope anchor for anchoring one or more ropes of an elevator, the rope anchor comprising at least:

a wedge housing including a tapering nest having a narrow end open towards a first direction, and a wide end open towards a second direction;

one or more wedge members in the tapering nest configured to be wedged against a rope passing through the tapering nest;

one or more spring members configured to urge the one or more wedge members towards the narrow end of the tapering nest;

a releasing mechanism actuatable to move the one or more wedge members towards the wide end of the tapering nest; and one or more guide rollers configured to guide the rope into the wide end of the tapering nest.

2. The rope anchor according to claim 1, wherein the releasing mechanism comprises a turnable actuation member turnable to move the one or more wedge members towards the wide end of the tapering nest.

3. The rope anchor according to claim 1, wherein each said wedge member comprises a rope groove configured to receive a rope.

4. The rope anchor according to claim 1, wherein the releasing mechanism comprises:

a push member movable to push one or more of the one or more wedge members in the tapering nest towards the wide end; and a turnable actuation member connected in a force transmitting manner with the push member, wherein the push member is movable by turning the turnable actuation member.

5. The rope anchor according to claim 4, wherein the releasing mechanism comprises one or more transmission members between the turnable actuation member and the push member, the one or more transmission members configured to transmit movement of the turnable actuation member to the push member to move the push member to push said one or more wedge members.

6. The rope anchor according to claim 1, wherein the rope anchor comprises a frame and a releasable rope locking means on the frame, the releasable rope locking means configured to lock one or more ropes immovable relative to the frame, the one or more ropes including at least said rope, and act on a portion of the rope to be locked, the portion of the rope to be locked extending into the nest from a side of the wedge housing towards the wide end of the nest.

7. An elevator arrangement comprising:

an elevator car in a hoistway; and a roping comprising at least a rope connected to the elevator car, and the rope anchor according to claim 1 anchoring the rope.

8. The elevator arrangement according to claim 7, further comprising:

a housing machine moveable in a first position in the hoistway, wherein the rope passes around a drive wheel of the hoisting machine.

9. The elevator arrangement according to claim 8, further comprising:

a hoisting arrangement configured to at least one of hoist the hoisting machine to a second position in the hoistway, the second position being higher than said first position, hoist the rope anchor in the hoistway, or hoist a rope fixing of the rope in the hoistway.

10. The elevator arrangement according to claim 7, wherein the rope anchor comprises a frame and a releasable rope locking means on the frame, the releasable rope locking means configured to lock one or more ropes immovable relative to the frame, the one or more ropes including at least said rope, and act on a portion of the rope to be locked, the portion of the rope to be locked extending into the nest from a side of the wedge housing towards the wide end of the nest.

11. A method for constructing an elevator, the method comprising:

providing an elevator arrangement as defined in claim 7;

transporting passengers and/or goods in an elevator car while a hoisting machine is in a first position in a hoistway;

performing construction work while the hoisting machine is in said first position;

releasing the rope anchor by actuating the releasing mechanism to move the one or more wedge members towards the wide end of the tapering nest;

hoisting the hoisting machine, mounting the hoisting machine to a second position higher than the first position, and supplying an additional portion of rope from a rope supply storage through the released rope anchor;

reanchoring the rope with the rope anchor; and using the elevator car for transporting passengers and/or goods while the hoisting machine is in said second position.

12. An elevator arrangement comprising:

the rope anchor according to claim 1; and a rope supply storage, wherein the rope passes from the rope supply storage to the rope anchor, and from the rope anchor to an elevator car.

13. The elevator arrangement according to claim 12, wherein the rope supply storage is lower than the rope anchor, and the rope passes from the rope supply storage upwards, over a guide roller mounted higher than the tapering nest and downwards to the rope anchor.

14. The rope anchor according to claim 1, wherein the narrow end is below the wide end.

* * * * *